United States Patent
Kim

(10) Patent No.: US 9,170,721 B2
(45) Date of Patent: Oct. 27, 2015

(54) DISPLAYING SCROLL BAR ON TERMINAL

(75) Inventor: Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1171 days.

(21) Appl. No.: 12/016,964

(22) Filed: Jan. 18, 2008

(65) Prior Publication Data

US 2008/0178116 A1    Jul. 24, 2008

(30) Foreign Application Priority Data

Jan. 19, 2007 (KR) .................. 10-2007-0006332

(51) Int. Cl.
*G06F 3/048* (2013.01)
*G06F 3/0484* (2013.01)
*G06F 3/0485* (2013.01)

(52) U.S. Cl.
CPC ........ *G06F 3/04847* (2013.01); *G06F 3/04855* (2013.01)

(58) Field of Classification Search
CPC ............ G06F 3/04847; G06F 3/04855; G06F 3/0485; G06F 3/0488; G06F 3/0482
USPC ................. 715/786, 787, 864, 866, 710, 763
See application file for complete search history.

(56) References Cited

U.S. PATENT DOCUMENTS

| | | | |
|---|---|---|---|
| 5,402,152 A | 3/1995 | Needham | |
| 5,479,600 A * | 12/1995 | Wroblewski et al. | 715/787 |
| 5,510,808 A * | 4/1996 | Cina et al. | 345/684 |
| 5,528,259 A * | 6/1996 | Bates et al. | 345/676 |
| 5,532,715 A | 7/1996 | Bates et al. | |
| 5,655,094 A * | 8/1997 | Cline et al. | 715/786 |
| 5,945,998 A * | 8/1999 | Eick | 345/589 |
| 6,014,140 A * | 1/2000 | Strand | 345/684 |
| 6,177,938 B1 * | 1/2001 | Gould | 715/784 |
| 6,204,846 B1 | 3/2001 | Little et al. | |
| 6,252,594 B1 | 6/2001 | Xia et al. | |
| 6,339,438 B1 | 1/2002 | Bates et al. | |
| 6,348,936 B1 * | 2/2002 | Berteig | 715/856 |
| 6,570,594 B1 * | 5/2003 | Wagner | 715/786 |
| 7,401,300 B2 * | 7/2008 | Nurmi | 715/866 |
| 7,480,868 B2 * | 1/2009 | Novak et al. | 715/746 |
| 7,689,928 B1 * | 3/2010 | Gilra | 715/787 |
| 7,765,491 B1 * | 7/2010 | Cotterill | 715/833 |
| 2002/0065110 A1 * | 5/2002 | Enns et al. | 455/566 |

(Continued)

FOREIGN PATENT DOCUMENTS

| | | |
|---|---|---|
| JP | 6-203136 | 7/1994 |
| KR | 1020040076649 | 9/2004 |
| KR | 10-0463901 | 12/2004 |

OTHER PUBLICATIONS

Seltzer, Larry. You can create colored scroll bars using Cascading Style Sheets or JavaScript. PC Magazine; Jun. 12, 2001, vol. 20 Issue 11, pIP08, 1p.*

(Continued)

*Primary Examiner* — Amy M Levy
(74) *Attorney, Agent, or Firm* — Lee, Hong, Degerman, Kang & Waimey

(57) ABSTRACT

A method and a mobile terminal for scrolling data on a screen. The method includes storing scroll bar information, displaying at least one data file and a scroll bar for scrolling a screen displaying the data file, and selectively changing a characteristic of the scroll bar. Changing the characteristic of the scroll bar includes changing at least one of the scroll bar size, shape, display location, and color.

9 Claims, 21 Drawing Sheets

(56) References Cited

U.S. PATENT DOCUMENTS

| | | | |
|---|---|---|---|
| 2002/0186252 A1* | 12/2002 | Himmel et al. | 345/787 |
| 2005/0091584 A1* | 4/2005 | Bogdan et al. | 715/514 |
| 2005/0091604 A1* | 4/2005 | Davis | 715/772 |
| 2005/0210446 A1* | 9/2005 | Novak et al. | 717/115 |
| 2005/0285965 A1* | 12/2005 | Zimmer et al. | 348/333.11 |
| 2006/0026535 A1* | 2/2006 | Hotelling et al. | 715/863 |
| 2006/0197753 A1* | 9/2006 | Hotelling | 345/173 |
| 2007/0150830 A1* | 6/2007 | Ording et al. | 715/784 |
| 2007/0192744 A1* | 8/2007 | Reponen | 715/833 |
| 2007/0208518 A1* | 9/2007 | Gordon et al. | 702/20 |
| 2007/0247979 A1* | 10/2007 | Brillon et al. | 369/30.06 |
| 2008/0034316 A1* | 2/2008 | Thoresson | 715/781 |
| 2008/0104535 A1* | 5/2008 | DeLine et al. | 715/785 |
| 2008/0122796 A1* | 5/2008 | Jobs et al. | 345/173 |
| 2008/0134033 A1* | 6/2008 | Burns et al. | 715/705 |

OTHER PUBLICATIONS

Dietrich, Hans. ResizeScrollbar—How to change width of built-in scroll bars. Article first posted Feb. 7, 2002 on Code Project.com. Retrieved from http://www.codeproject.com/KB/miscctrl/resizescrollbar.aspx on Jan. 24, 2011.*

European Patent Office Application Serial No. 08000577.0, Search Report dated Jan. 7, 2013, 8 pages.

* cited by examiner

DISPLAYING SCROLL BAR ON TERMINAL

CROSS-REFERENCE TO RELATED APPLICATION

Pursuant to 35 U.S.C. §119(a), this application claims the benefit of earlier filing date and right of priority to Korean Patent Application No. 10-2007-0006332 filed on Jan. 19, 2007, the contents of which are hereby incorporated by reference herein in its entirety.

FIELD OF INVENTION

The present invention is directed to a scroll bar displayed on a mobile terminal for scrolling data on a screen therein.

DESCRIPTION OF RELATED ART

As the demand for mobile communication terminals rapidly increases, providing mobile terminals having a variety of convenient services and functions is required.

A typical mobile terminal is equipped with an input device having key buttons formed thereon, for selecting various menus and functions. A user can select desired data by manipulating the input device.

When the amount of the selected data is too large to be displayed in one screen, a scroll bar is displayed in the screen. Thus, the user could view data which is not displayed in the screen by scrolling the screen using the scroll bar.

The size of the scroll bar is altered according to the amount of the data to be displayed in the screen. For example, if the amount of data to be displayed in the screen is small, the length of the scroll bar is increased. On the other hand, if the amount of the data to be displayed in the screen is large, the length of the scroll bar becomes shorter compared to the former case.

The larger the amount of the data to be displayed, the shorter the length of the scroll bar becomes. Thus, it's very inconvenient for the user to touch and move the scroll bar especially in a touch input device.

In addition, the given scroll bar of the mobile terminal has a square shape, a gray color, and the user could not change its shape.

SUMMARY OF THE INVENTION

In one general aspect of the present invention, a method for scrolling data in a mobile terminal includes storing scroll bar information, displaying data and a scroll bar for scrolling a screen displaying the data, and selectively changing a characteristic of the scroll bar responsive to the scroll bar information.

It is contemplated that changing the characteristic of the scroll bar includes changing at least one of the scroll bar size, shape, display location, and color. It is further contemplated that the scroll bar is displayed in a predetermined size regardless of a quantity of the displayed data.

It is contemplated that the scroll bar is displayed on a touch input device. It is further contemplated that the touch input device displays a screen for changing the size of the scroll bar upon contact with the scroll bar.

It is contemplated that changing of the scroll bar size is in accordance with contact and dragging of a specific area of the displayed scroll bar. It is further contemplated that the method further includes displaying the scroll bar to scroll a screen displaying at least a portion of the data, and displaying location information indicating a location of the portion of the data among a total quantity of the data, wherein the location information is displayed on a specific area contiguous to or overlapped on the scroll bar.

It is contemplated that the displaying location information divides an area of the scroll bar into a specific number of sub-areas based on the total quantity of the data, and displays the location information as at least one of a shape, a symbol, and a character on a specific sub-area. It is further contemplated that the specific sub-area displaying location information is displayed in a color different from colors of other sub-areas.

It is contemplated that the location information is displayed as at least one of a symbol, a number, and a character. It is further contemplated that the method further includes displaying the scroll bar in a specific color to scroll a screen displaying the data, and changing the specific color.

It is contemplated that the scroll bar is displayed in a different color according to a type of the displayed data. It is further contemplated that the method further includes outputting one or more of an audio, vibration, and light if the scroll bar moves.

It is contemplated that the method further includes storing one or more shape information of the scroll bar information and data to be displayed. It is further contemplated that changing specific shape information is performed by selecting a different shape from the stored one or more shape information.

It is contemplated that displaying the data displays a shape of the scroll bar differently according to a type of the displayed data. It is further contemplated that the shape information comprises an icon.

In another general aspect of the present invention, a mobile terminal includes a memory for storing data and scroll bar information, a display for displaying a scroll bar to scroll a screen on the display, and a controller for controlling the scroll bar and the display of the scroll bar according to the stored information, wherein a characteristic of the scroll bar can be selectively changed.

BRIEF DESCRIPTION OF THE DRAWINGS

The aspects and features of the present invention and methods for achieving the aspects and features will be apparent by referring to the embodiments to be described in detail with reference to the accompanying drawings. However, the present invention is not limited to the embodiments disclosed hereinafter but can be implemented in diverse forms. The matters defined in the description, such as the detailed construction and elements, are nothing but specific details provided to assist those of ordinary skill in the art in a comprehensive understanding of the invention. The present invention is only defined within the scope of the appended claims. In the entire description of the present invention, the same drawing reference numerals are used for the same elements across various figures.

DETAILED DESCRIPTION OF PREFERRED EMBODIMENTS

Figure 1:
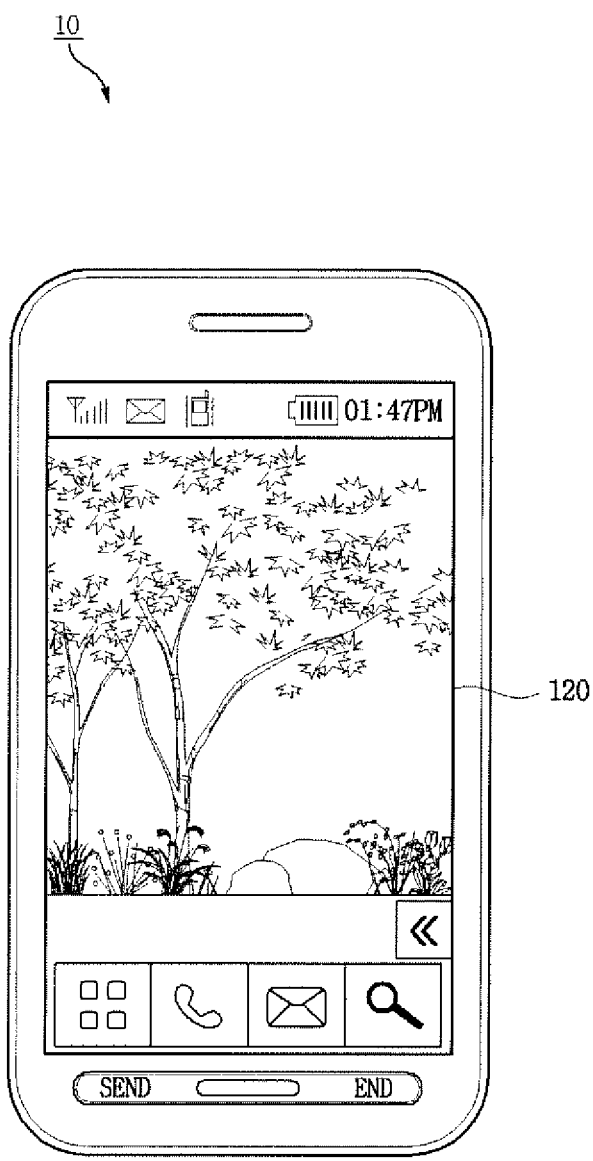
FIG. 1 is a front view of a mobile terminal according to an embodiment of the present invention.

A method for displaying scroll bars on a mobile terminal, and a mobile terminal for performing the same will now be described in detail with reference to the accompanying drawings. In the accompanying drawings, the same reference numerals are used to denote the same or similar functional elements throughout the accompanying drawings.

Figure 2:
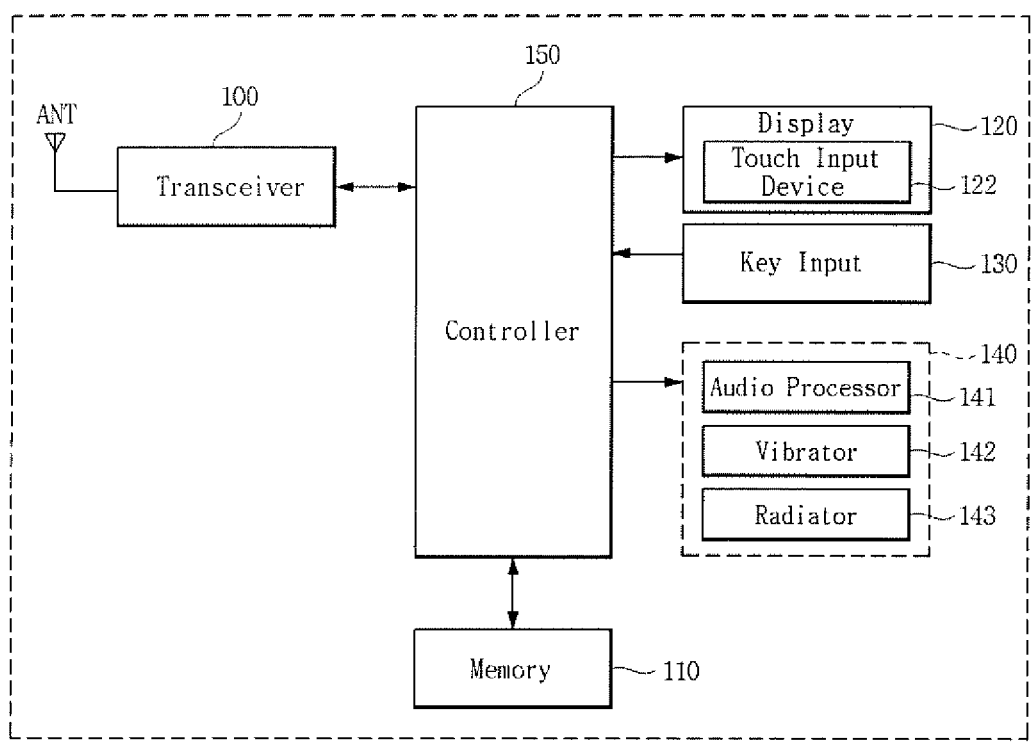
FIG. 2 is a block diagram illustrating the mobile terminal according to an embodiment of the present invention.

FIG. 1 is a front view of a mobile terminal and FIG. 2 is a block diagram illustrating a communication terminal according to an embodiment of the present invention. As illustrated in FIG. 1, the terminal may be a mobile terminal 10.

With reference to FIG. 2, the mobile terminal 10 comprises a transceiver 100, a memory 110, a display 120, a key input 130, an output 140, and a controller 150.

The transceiver 100 receives data from a base station (not shown) through an antenna ANT, and transmits data generated from the mobile terminal 10 to the base station through the antenna ANT.

The memory 110 may comprise both a volatile memory and a nonvolatile memory, such as a flash-memory, a Random-Access Memory (RAM), and an Electrically Erasable Programmable Read Only Memory (EEPROM).

The memory 110 stores programs and data for controlling overall operation of the mobile terminal 10. The memory 110 further stores data such as menus and files to be displayed on the display 120.

Figure 4:
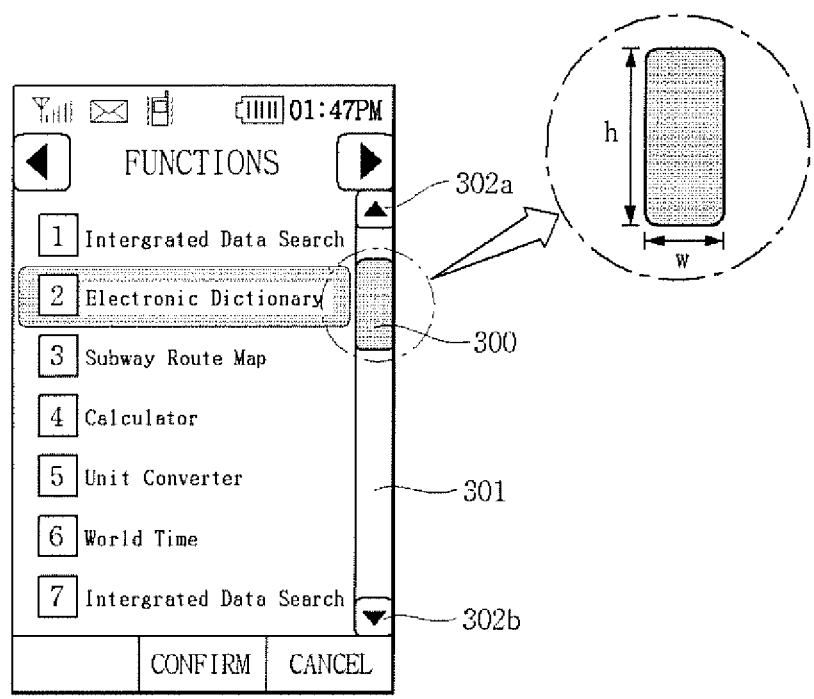
FIG. 4 illustrates a view of a screen displaying a scroll bar according to an embodiment of the present invention.

The memory 110 stores information for displaying a scroll bar 300 on the display 120 (FIG. 4). The information for displaying the scroll bar 300, which will be referred to hereinafter as a display information, may include shape, color and size of the scroll bar, and location information indicating location of a portion of the data among a total quantity of the data, in which the part is displayed on a screen of the display 120.

The display 120 displays contents received through the transceiver 100, a variety of information signals, data stored in the memory 110, and the scroll bar 300. The display 120 includes a touch input device 122 which may be implemented as a touch screen. If a user inputs data by touching the touch input device 122, the touch input device 122 displays the corresponding result.

The display 120 may display at least one scroll bar in various shapes and colors for scrolling a screen in all directions. The screen displaying a portion of the data may be moved into another portion of the data which is located at the right, left, upper or lower of the displayed portion of the data.

The key input 130 includes a plurality of number keys and function keys. The key input 130 outputs to the controller 150 a signal corresponding to the key selected by the user.

The output 140 comprises an audio processor 141, a vibrator 142, and a lighting device 143. The output 140 generates a corresponding output when the scroll bar on the touch input device 122 is touched or moved.

The audio processor 141 may output an audio or a voice upon moving of the scroll bar. The vibrator 142 may vibrate upon moving of the scroll bar. Alternatively, the lighting device 143 may illuminate with one of a plurality colors upon movement of the scroll bar.

The controller 150 controls general input and output of the terminal 10, along with the scroll bar which is displayed on the display 120 according to the data stored in the memory 110.

Figure 3:
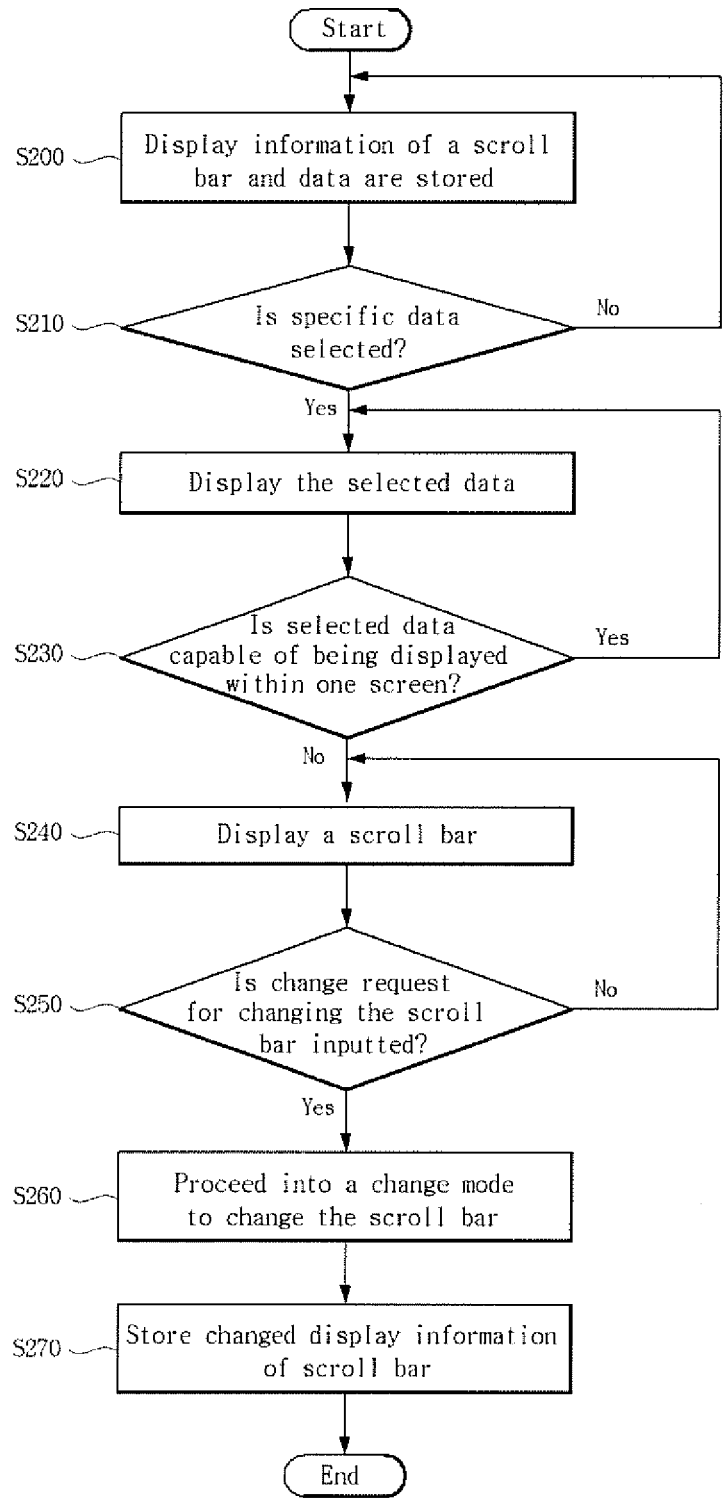
FIG. 3 is a flowchart illustrating a method for displaying a scroll bar using a mobile terminal.

FIG. 3 is a flowchart illustrating a method for displaying a scroll bar for a terminal.

The display information of the scroll bar and a plurality of data are stored in the memory 110 (S200). The controller 150 determines whether specific data is selected among a plurality of data which is stored in the memory 110 (S210). If the specific data is stored in the memory 110, the controller 150 displays the selected data on the display 120 (S220).

The controller 150 determines whether the selected data is capable of being displayed within one screen (S230). If the specific data cannot be displayed within one screen (S230), the controller 150 displays a scroll bar on one side of the display 120 (S240). The controller 150 retrieves the scroll bar display information stored in the memory 110 to display the scroll bar.

If a change request for changing the scroll bar is inputted (S250), the controller 150 proceeds into a change mode to change the scroll bar (S260).

In the change mode, the controller 150 may provide the display 120 with a specific menu for changing the display information of the scroll bar. Alternatively, the controller may change the display information of the scroll bar based on input information through user contact with the touch input device 122.

Accordingly, the controller 150 stores the changed display information of the scroll bar in the memory 110 (S270).

Setting and Changing the Scroll Bar Size

FIG. 4 illustrates a screen displaying a scroll bar according to an embodiment of the present invention. Referring to FIG. 4, the controller 150 displays a scroll bar 300 on one side of the touch input device 122. The scroll bar 300 is located between an upward key 302a and a downward key 302b on a guide part 301 guiding a movement path when the scroll bar 300 moves up and down.

Alternatively, the scroll bar 300 may move in a left or right direction. In this case, the moving directions of the movement keys 302A and key 302B may be changed to the left and right directions, respectively.

The scroll bar 300 has a predetermined size, i.e., length h and width w, according to the scroll bar display information. According to an embodiment of the present invention, the size characteristics of the scroll bar 300 may be changed by the user.

Figure 5A:
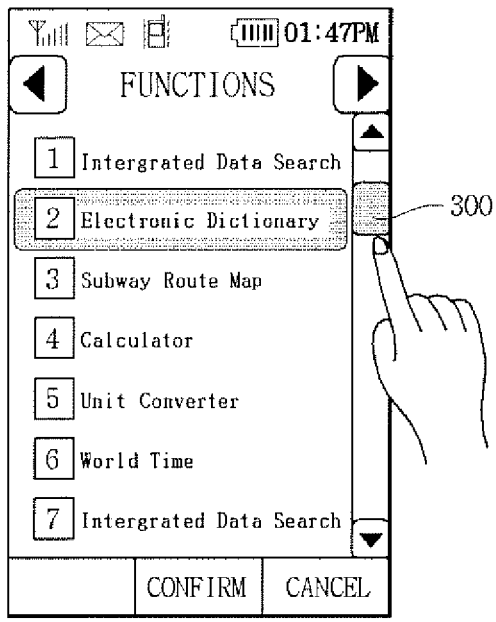
FIGS. 5A-5C illustrate screens for setting a length of a scroll bar according to an embodiment of the present invention.
Figure 5B:
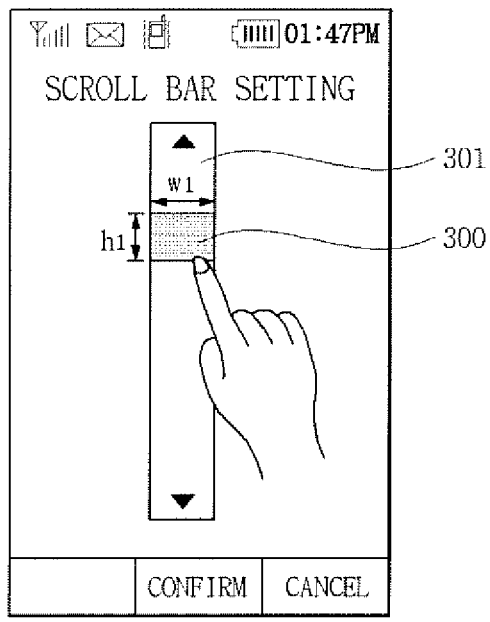
Figure 5C:
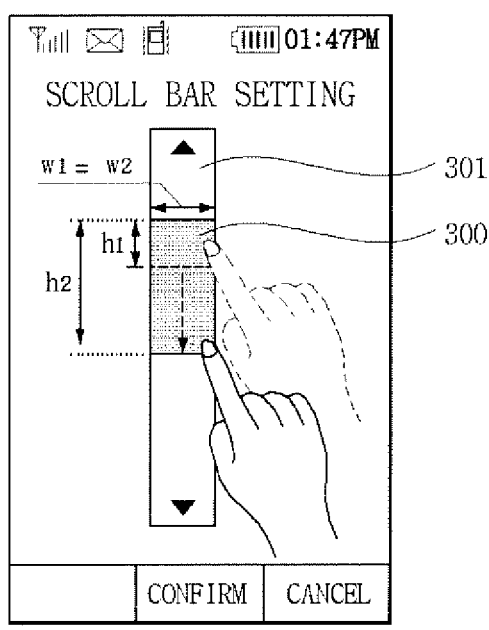

FIGS. 5A-5C illustrate screens for setting a length of a scroll bar according to an embodiment of the present invention.

Referring to FIG. 5A, the controller 150 displays a scroll bar 300 on one side of the touch input device 300. As illustrated in FIG. 5B, the controller 150, displays on the touch input device 122 a "SCROLL BAR SETTING" menu to set a size for the scroll bar 300 when the scroll bar 300 is touched.

For example, the scroll bar 300 has a size of length h1 and width w1. If a user touches a bottom area of the scroll bar 300 and drags downward, the controller 150 allows the scroll bar 300 to be expanded in the direction of the drag while setting the guide part 301 to be fixed.

If the drag distance is h2, the controller 150 changes the size of the scroll bar 300 to the length h2 (FIG. 5C). In this case, the length of the scroll bar 300 may be changed from the length h1 to the new length h2 without changing the width of the scroll bar 300. The width w1 of the scroll bar 300 may also be changed.

Figure 6A:
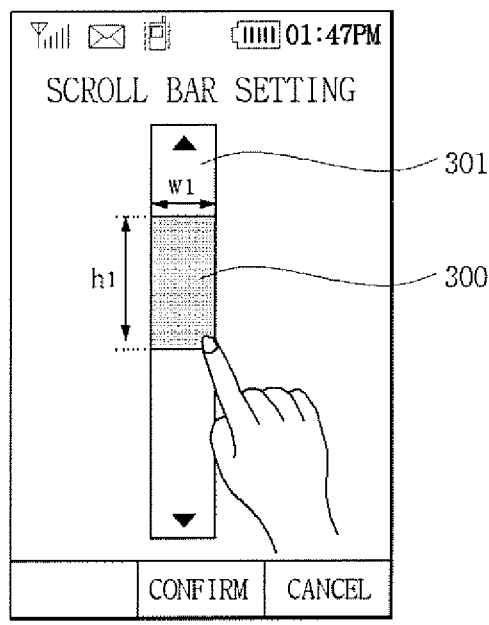
FIGS. 6A and 6B illustrate screens for setting a width of a scroll bar.
Figure 6B:
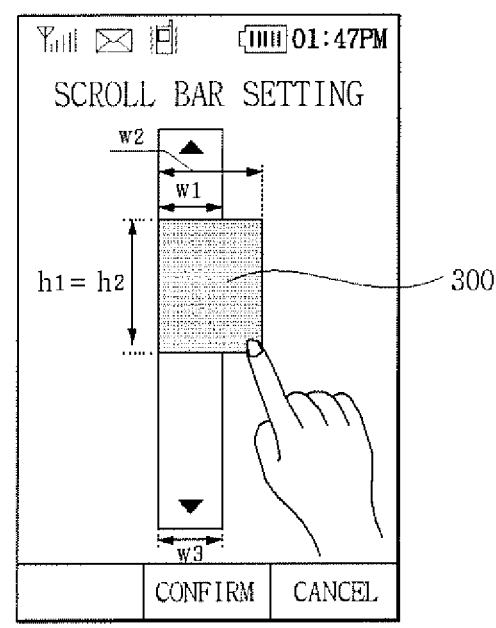

FIGS. 6A and 6B illustrate screens for setting a width of a scroll bar 300. For example, with reference to FIG. 6A, the scroll bar 300 has the length h1 and the width w1. If the user touches a specific area of the scroll bar and drags in a desired direction, the controller 150 controls the scroll bar 300 to be expanded in the direction to which the scroll bar 300 is dragged, while controlling the guide part 301 to be fixed.

As illustrated in FIG. 6B, the controller 150 changes the size of the scroll bar 300 to a length h2 and a width w2. The width of the scroll bar 300 may be changed from the width w1 to the new width w2 without changing the length h1 of the scroll bar 300. Alternatively, both the length h1 and width w1 of the scroll bar 300 may be changed.

Figure 7A:
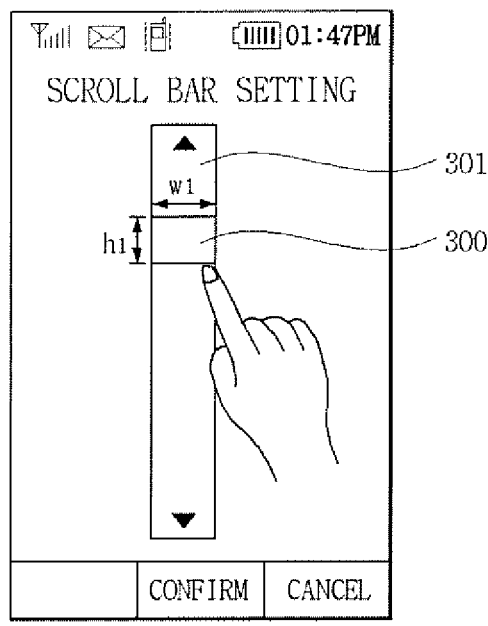
FIGS. 7A and 7B illustrate screens for setting both the length and the width of a scroll bar.
Figure 7B:
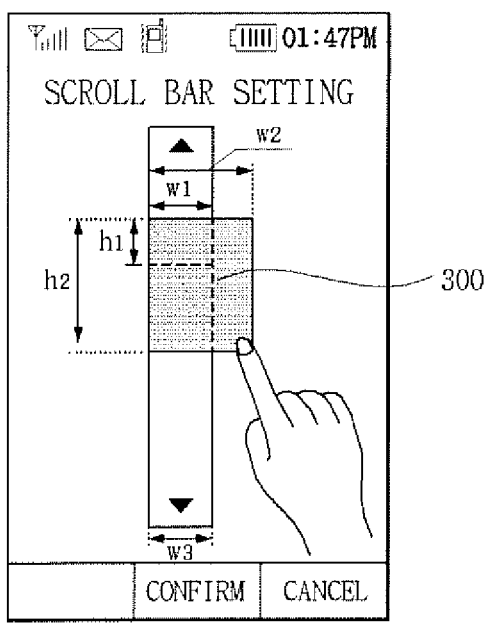

FIGS. 7A and 7B illustrate screens for setting a length and a width of a scroll bar.

For example, as illustrated in FIG. 7A, the scroll bar 300 has a length h1 and a width w1. If the user touches a specific area of the scroll bar 300 and drags in a desired direction, the controller 150 changes the size of the scroll bar 300 to a length h2 and a width w2 according to a distance of the drag. The controller 150 controls the scroll bar 300 to be changed from the initial length h1 and width w1 to the new length h2 and the width w2 while controlling the guide part 301 to be fixed, as illustrated in FIG. 7B.

Figure 8A:
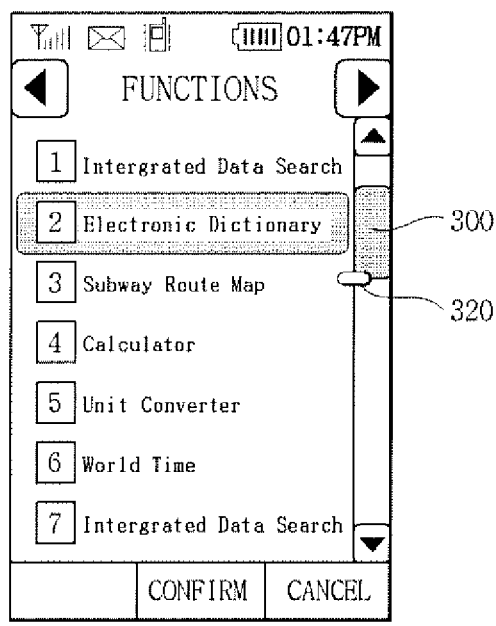
FIGS. 8A and 8B illustrate screens for setting a size of a scroll bar on a touch input device.
Figure 8B:
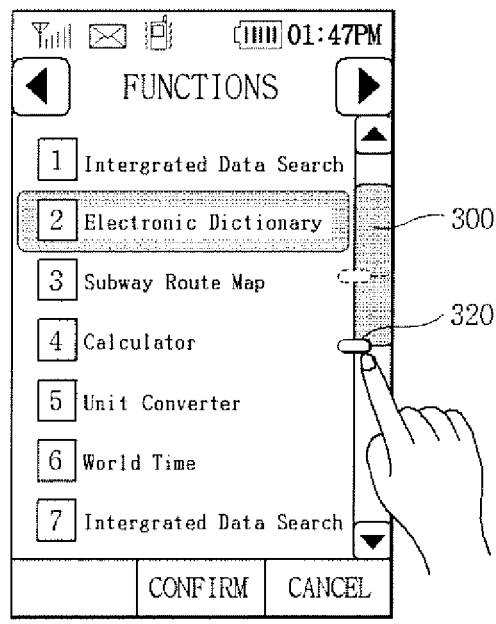

FIGS. 8A and 8B illustrate screens for directly setting a size of a scroll bar on the touch input device. The controller 150 may display an indicator for adjusting the size of the scroll bar 300.

As illustrated in FIG. 8A, the controller 150 displays an indicator 320 on one side of the scroll bar 300. If the user touches the indicator 320 and drags in a desired direction and then terminates the drag, the controller 150 will set the size of the scroll bar 300 according to the distance of the drag.

Notification of Location of Data Displayed on a Screen Through a Scroll Bar

FIGS. 9A-9D illustrate screens for displaying a location of the data displayed on a screen through a scroll bar display.

Figure 9A:
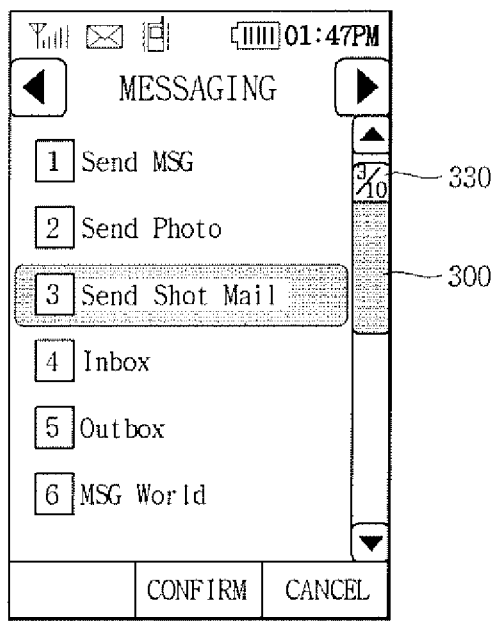
FIGS. 9A-9D illustrate screens displaying a location of presently displayed data on the scroll bar.

With reference to FIG. 9A, the controller 150 displays the scroll bar 300 for scrolling data on the display 120. The controller 150 also displays allocation information indicator 330 informing of the location information through at least one of a symbol, a number, and a character positioned on one side of the scroll bar 300. The location information indicates the location of the displayed data among the total data to be displayed.

The location information indicator 330 may indicate a page number of a presently displayed data versus all pages of the data. For example, if the total number of data pages to be displayed is 10 and a page number of the presently displayed data is page 3, the controller 150 may set the location information indicator 330 to display '3/10'.

The above description is not intended to be limiting, the location information may be counted similarly in a line unit basis instead of the page unit basis as described above. The controller 150 may display the location information indicator 330 at any part of the scroll bar 300.

Figure 9B:
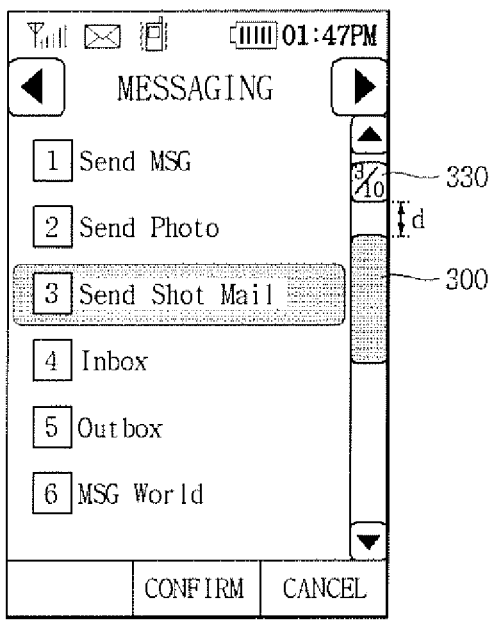

In FIG. 9A, the location information indicator 330 is displayed at an upper end of the scroll bar 300. As illustrated in FIG. 9B The controller 150 may display the location information indicator 330 separated from the scroll bar 300, by a predetermined interval 'd'.

Figure 9C:
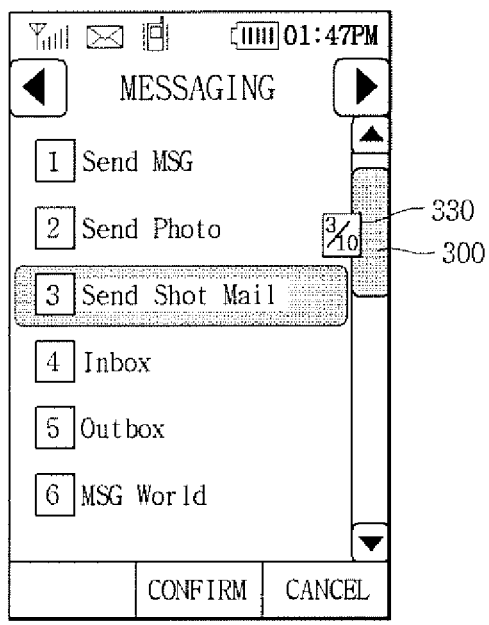
Figure 9D:
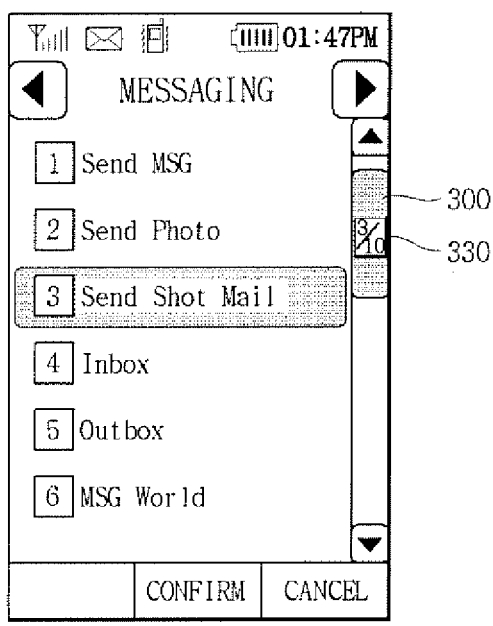

With reference to FIG. 9C, the controller 150 may display the location information indicator 330 at a side of the scroll bar 300 to be overlaid therewith. As shown in FIG. 9D, the controller 150 may display the location information indicator 330 inside the scroll bar 300. The location information indicator 330 may also be displayed in different shapes.

Figure 10A:
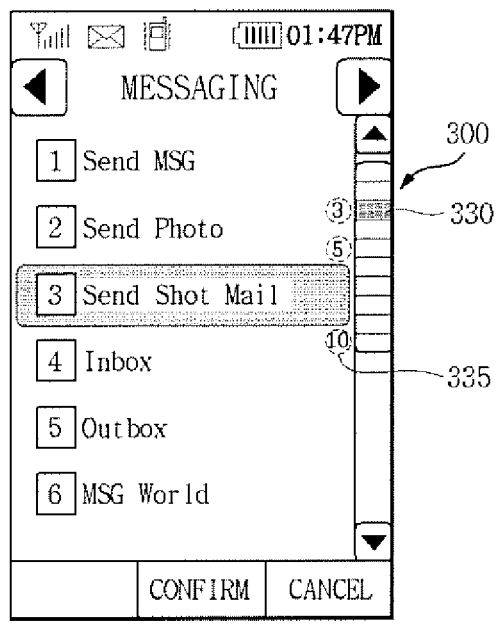
FIGS. 10A and 10B illustrate screens setting areas for displaying the location of a present screen on a scroll bar.
Figure 10B:
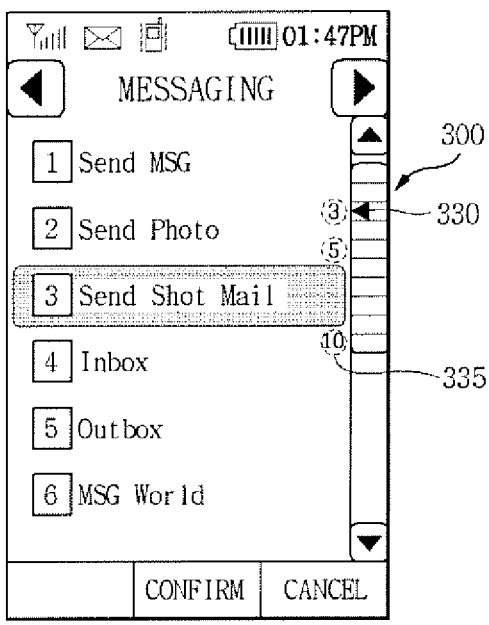

FIGS. 10A and 10B illustrate screens for setting a scroll bar to display a location of presently displayed data.

As shown in FIG. 10A, the controller 150 divides an inner area of the scroll bar into a specific number of sub-areas based on the total amount of the specific data to be displayed. The controller 150 displays the location information as at least one of a shape, a symbol, and a character on a specific sub-area of the sub-areas.

For example, the controller 150 divides the inner area of the scroll bar 300 into ten sub-areas 335 when the total number of all pages of data to be displayed is 10 pages. The controller 150 may indicate a page number of a presently displayed data among the total data.

In this example, the controller 150 may display the location information indicator 330 in the third sub-area of the scroll bar 300 that is divided into ten equal parts in case that a presently displayed data is the third page of the total ten pages.

The controller 150 may display the location information indicator 330 in a color different from those of the other sub-areas of the scroll bar 300. The controller 150 may display page numbers corresponding to all or part of the sub-areas on one side of the scroll bar 300.

As illustrated in FIG. 10B, the controller 150 may display the location information as a symbol, for example, '◀', a character or a picture.

Setting and Changing Color of a Scroll Bar

Figure 11:
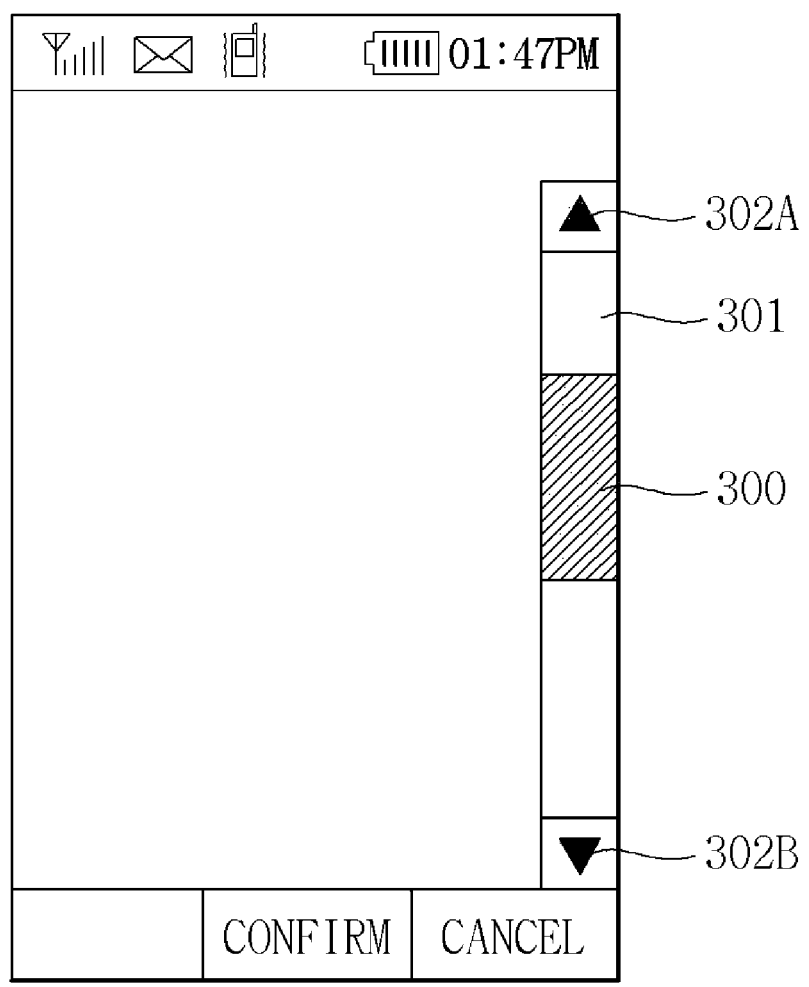
FIG. 11 illustrates a scroll bar having a specific color.

FIG. 11 illustrates a scroll bar having a specific color. A controller 150 may display the scroll bar 300 in a color different from those of the guide part 301, the upward movement key 302A, and the downward movement key 302B.

For example, if the guide part 301, the upward movement key 302A, the downward movement key 302B are gray, the controller 150 may display the scroll bar 300 in a different color, such as blue. The color of the scroll bar 300 may be selectively set or changed.

A user may select a specific color based on color information regarding the various colors stored at the memory 110 and then may set the scroll bar 300 to have the selected color.

Figure 12A:
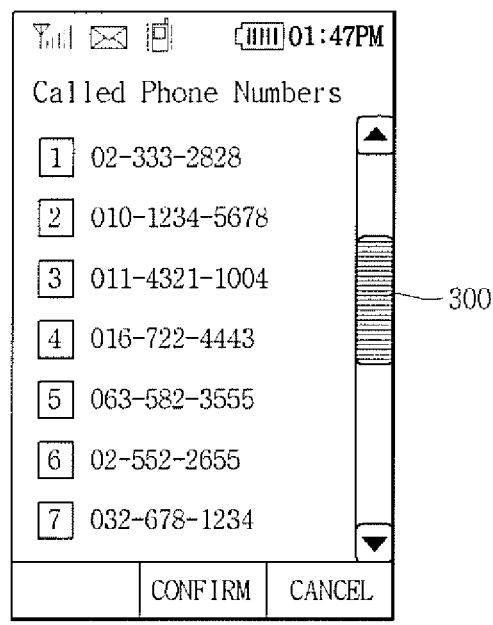
FIGS. 12A and 12B illustrate screens wherein a color of a scroll bar displayed thereon changes according to a type of data displayed.
Figure 12B:
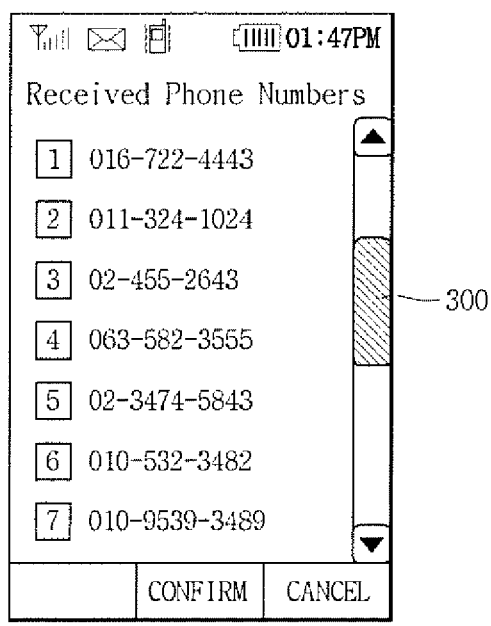

FIGS. 12A and 12B illustrate screens wherein color of a scroll bar displayed thereon changes according to the type of data displayed.

With reference to FIG. 12A, the controller 150 displays a list of recently called phone numbers on the display 120. The memory 110 stores color of the scroll bar 300 corresponding to the data of the recently called phone numbers.

The controller 150 sets the scroll bar 300 to be displayed in the corresponding color stored at the memory 110 when the data of the recently called phone numbers is displayed on the display 120.

For example, the controller 150 displays the scroll bar 300 in black when another data is displayed on the display 120, then changes the color of the scroll bar 300 to pink when the data of the recently called phone numbers is selected to be displayed.

As illustrated in FIG. 12B, the controller 150 displays the data of recently received phone numbers on the display 120. The memory 110 stores color of the scroll bar 300 corresponding to the data of the recently received phone numbers.

Therefore, the controller 150 set the scroll bar 300 to be displayed in the corresponding color when the data of the recently received phone numbers are displayed on the display 120.

For example, the controller 150 sets the scroll bar 300 to be displayed in pink when the data of the recently called phone numbers is displayed on the display 120, then changes the scroll bar 300 to purple when the data of the recently received phone number is selected to be displayed.

Setting and Changing a Shape of a Scroll Bar

FIGS. 13A-13E illustrate screens having differently shaped scroll bars.

Figure 13A:
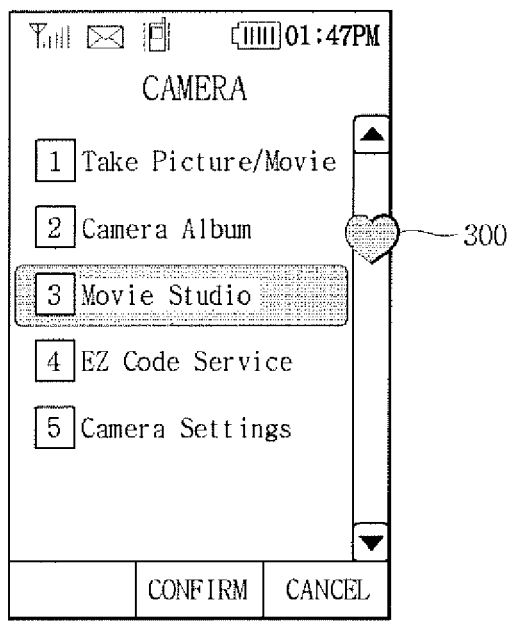
FIGS. 13A-13E illustrate screens having different shaped scroll bars.
Figure 13B:
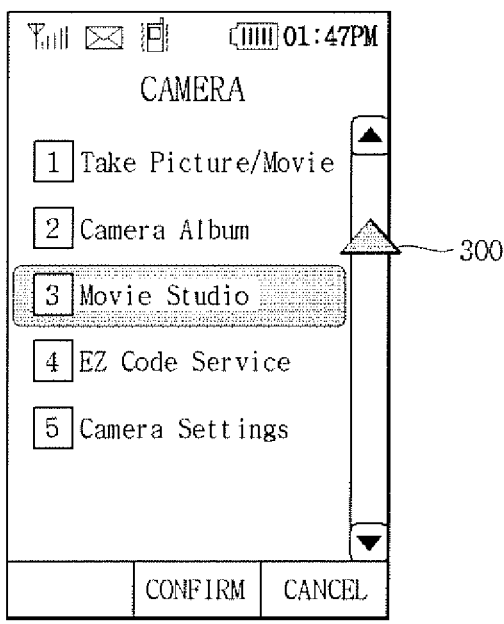
Figure 13C:
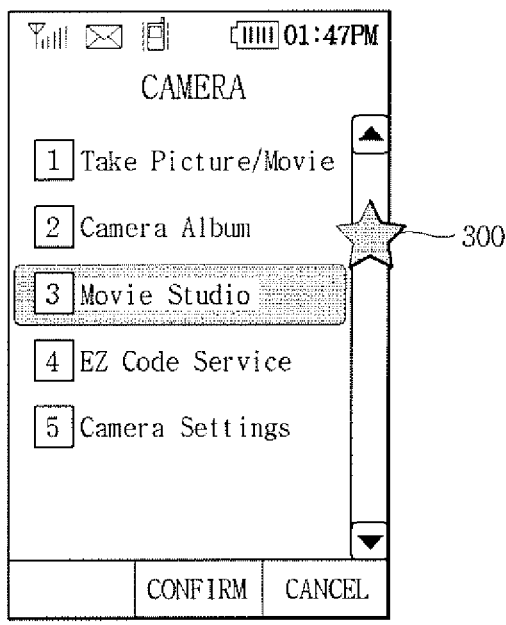

The controller 150 may set one of a variety of scroll bar 300 shapes. For example, the controller 150 may set the scroll bar 300 to be displayed as one of a heart, a triangle, and a star, as illustrated in FIGS. 13A-13C.

Figure 13D:
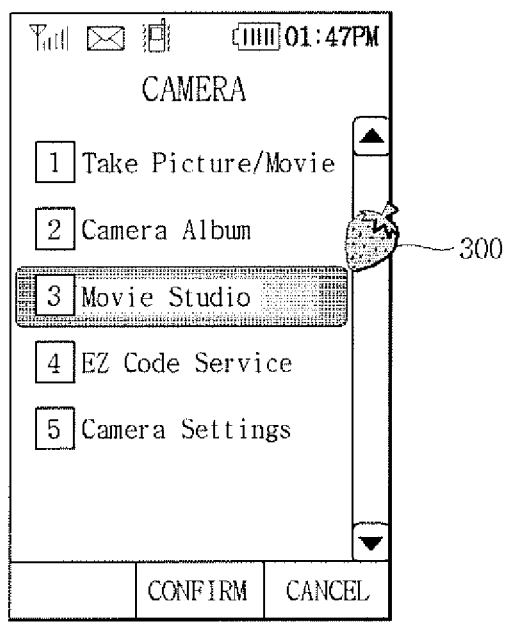
Figure 13E:
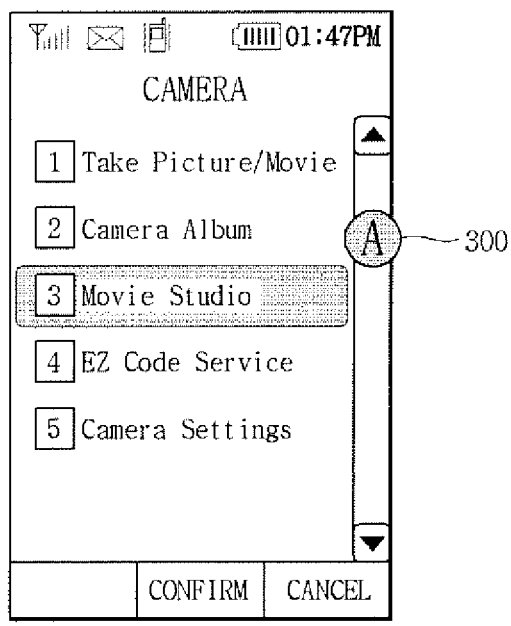

With reference to FIGS. 13D and 13E, the controller 150 may set the scroll bar 300 to be displayed as an icon of a strawberry or a geometric shaped object including text.

The shapes of the scroll bar 300 are stored in the memory 110, and a specific shape is selected from the stored shapes to be used as the shape of the scroll bar 300.

Figure 14:
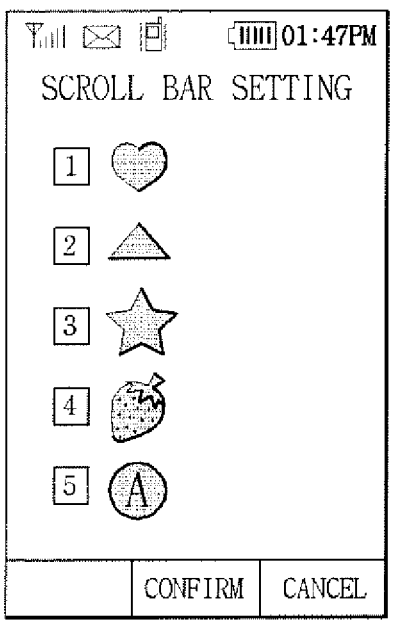
FIG. 14 illustrates a menu screen for scroll bar shape selection.

FIG. 14 illustrates a menu screen for scroll bar shape selection. The controller 150 displays a shape setting menu of the scroll bar, and displays a list of one or more shapes of the scroll bar stored in the memory 110 on the display 120. Accordingly, a user may select a desired shape from the list to set the shape of the scroll bar 300.

The controller may receive the shape of the scroll bar 300 through the transceiver 100. Furthermore, the user may create the shape of the scroll bar 300.

Figure 15A:
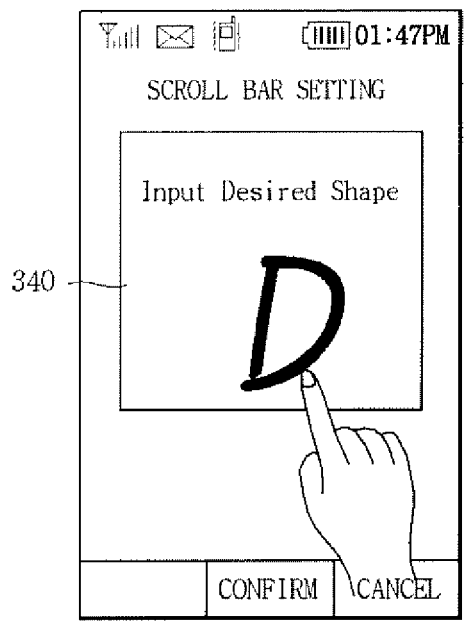
FIGS. 15A and 15B illustrate screens for setting a desired scroll bar shape according to touch input.
Figure 15B:
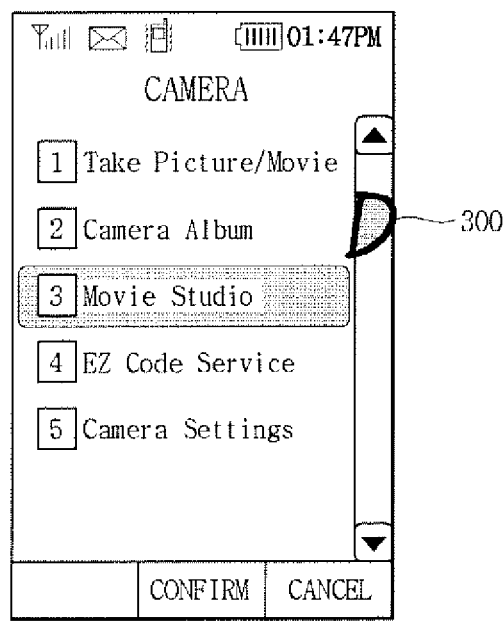

FIGS. 15A and 15B illustrate screens for setting a desired scroll bar shape according to touch input.

As shown in FIG. 15A, the controller 150 displays on the touch input device 122 an input screen 340 for setting the shape of the scroll bar 300. The user inputs a 'D' shape by touching the input screen 340 and sets the 'D' shape as the shape of the scroll bar 300. The controller 150 accordingly stores the 'D' shape in the memory 110. FIG. 15B illustrates the display of the scroll bar 300 set as the 'D' shape.

The controller 150 may control the output 140 to operate when the scroll bar 300 is scrolled. The output may include at least one of an audio 141, a vibrator 142, and a lighting device 143 to generate audio, vibration, and light upon scrolling of the scroll bar 300. The output may be set or changed by the controller 150.

Changing the Scroll Bar According to Touch Inputs

FIGS. 16A to 16E illustrates screens wherein sizes of scroll bars displayed thereon change corresponding to touch inputs according to another embodiment of the present invention.

Figure 16A:
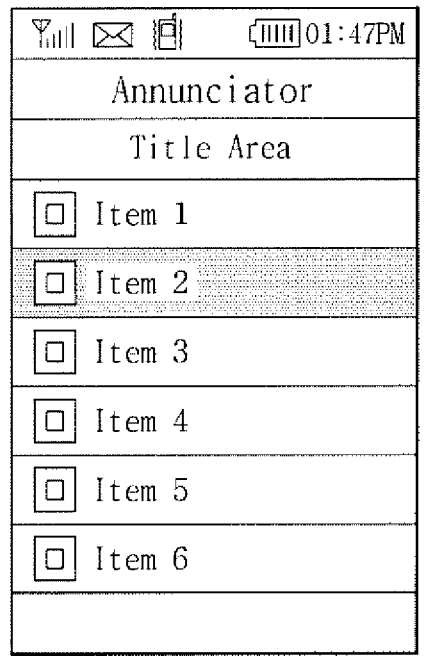
FIGS. 16A to 16E illustrates screens wherein sizes of scroll bars displayed thereon change according to touch inputs.

For example, as illustrated in FIG. 16A, the controller 150 may not display a scroll bar 300 and a guide part 301 on a screen until the touch input device 122 is once touched. Thereafter, as illustrated in FIG. 16B, the scroll bar 300 including the guide part 301 may appear on the screen if the touch input device 122 is once touched.

Figure 16B:
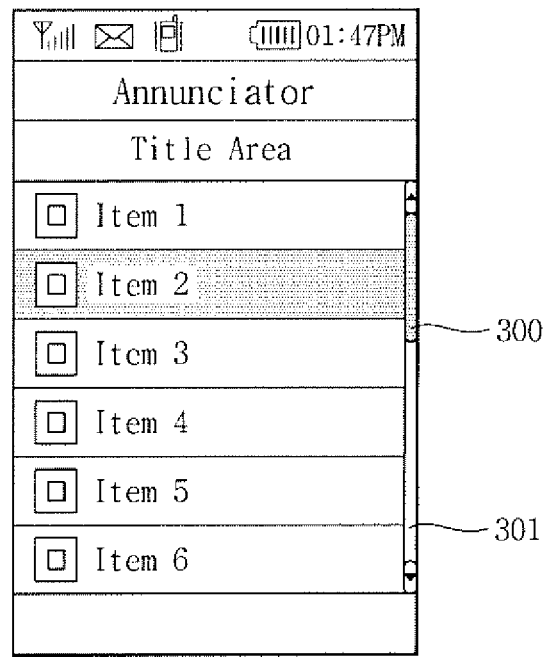

Alternatively, the scroll bar 300 and the guide part 301 may be displayed on the screen as shown in FIG. 16B even before the touch input device 122 is touched. That is, the scroll bar 300 and the guide part 301 may always be displayed on the screen if there is too much information to be displayed on one screen.

In FIG. 16B, the size of the scroll bar 300 and the guide part 301 may be set to be relatively small in length and/or width. Further, the scroll bar 300 including the guide part 301 may be overlaid transparently on the screen displaying a plurality of items so that the items may be seen through the scroll bar 300 and the guide part 301.

Figure 16C:
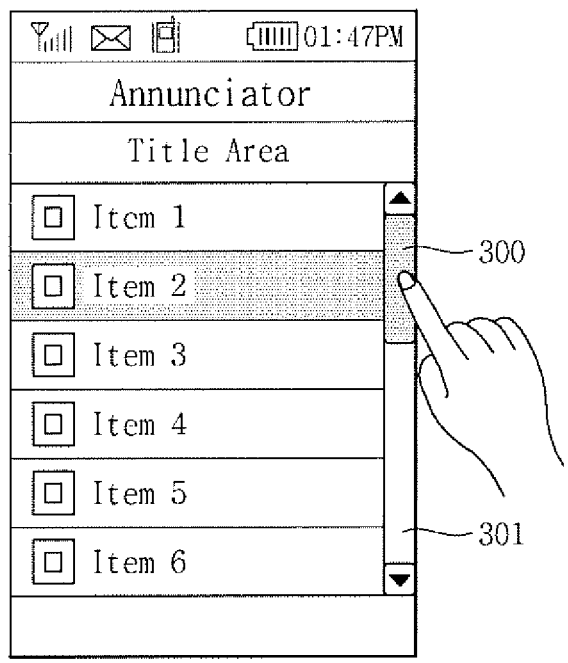

As illustrated in FIG. 16C, the scroll bar 300 may be changed in its size to become larger in length and/or width if an area of the scroll bar 300 or guide part 301 starts to be dragged. The size of the guide part 301 may be fixed irrespective of the size change of the scroll bar 300. Or, the guide part 301 may also be changed to become large in width corresponding to the size change of the scroll bar 300. Further, the transparency of the scroll bar 300 may be changed between the transparent and the nontransparent status.

Figure 16D:
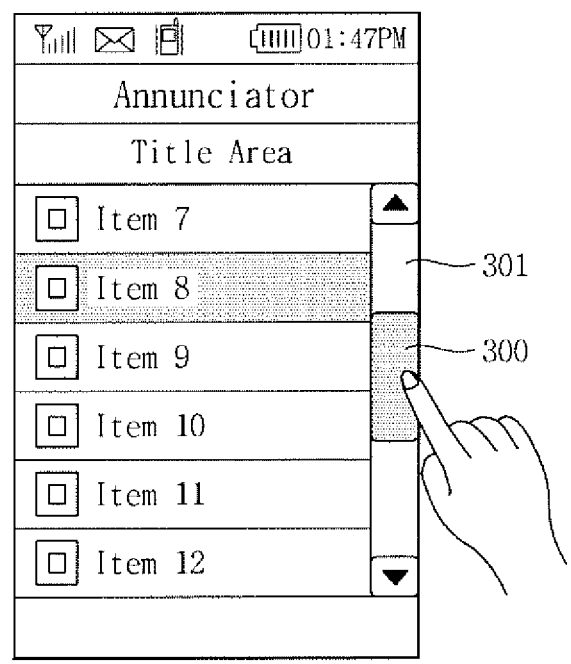

As illustrated in FIG. 16D, the scroll bar 300 may be changed in its size to become even larger in length and/or width up to a preset length and/or width as the scroll bar 300 is continuously dragged. Further, the transparency of the scroll bar 300 may be continuously changed from the transparent to the nontransparent status.

Figure 16E:
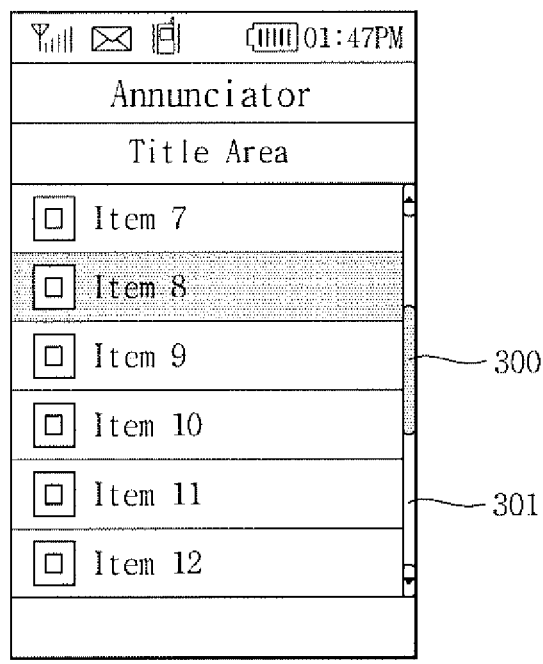

As illustrated in FIG. 16E, the scroll bar 300 and the guide part 301 may become smaller in length and/or as same as in FIG. 16B if the scroll bar 300 is released. Further, the transparency of the scroll bar 300 may be changed from the nontransparent to the transparent status. Further, the scroll bar 300 and the guide part 301 may disappear from the screen if a predetermined time lapses after the scroll bar 300 is released.

The above described changing sizes of the scroll bar 300 and the guide part 301 may be previously set for each state of FIGS. 16A to 16E by the user as described above with reference to FIGS. 6A to 7B. Further, the shape and/or color of the scroll bar 300 may also be set to change similar to the size changes of the scroll bar 300 as described above.

In the above descriptions, the display information of the scroll bar 300 is set by using the touch input device 122, however other input implementations may also be used. In practice, the display information of the scroll bar 300 may be set by using the key input 130, wherein the display information may be set or changed by using data selected from the display information stored in the memory 110.

The above described method for scrolling data on a mobile terminal display and displaying the scroll bar 300 may also be applicable to other devices, such as electric home appliances equipped with a touch input device 122.

Alternatively, the above described method for scrolling data on a mobile terminal display and displaying the scroll bar 300 may be applicable to a terminal having a display which is not a touch screen.

While the invention has been described in connection with preferred and practical embodiments, it is to be understood that the invention is not limited to the disclosed embodiments, but, on the contrary, is intended to cover various modifications and equivalent arrangements included within the spirit and scope of the appended claims.

What is claimed is:

1. A mobile terminal, comprising:
a touch screen;
a memory configured to store scroll element information;
a physical controller configured to:
display data on the touch screen,
display a scroll bar track on the touch screen;
display a scroll bar thumb in the scroll bar track on the touch screen according to the stored scroll element information, the scroll bar thumb permitting scrolling of the displayed data on the touch screen, the scroll element information defining one or more display characteristics of the scroll bar thumb, wherein the scroll bar thumb is visibly partitioned into a specific number of sub-areas based on a total number of pages of the data to be displayed, there being a one-to-one correspondence between the specific number of the sub-areas in the scroll bar thumb and the total number of pages of the data to be displayed,
display an indicator within a specific sub-area of the sub areas of the scroll bar thumb in such a manner that the indicator does not overlap any adjacent sub areas of the sub areas, wherein location of the indicator within the specific sub-area indicates a location of the displayed data among the total number of pages of the data to be displayed, wherein a displayed color of the indicator within the specific sub-area is different from displayed color of remaining sub-areas of the sub-areas,
scroll the displayed data to another page of the total number of pages of the data in response to a touch input to the scroll bar thumb, and
change which sub-area of the sub areas of the scroll bar thumb the indicator is displayed within in response to the touch input to the scroll bar thumb,
wherein the scroll bar thumb is displayed in 2D and has a predetermined size regardless of a quantity of the data to be displayed,
wherein a width of the scroll bar track is the same with a width of the scroll bar thumb, wherein a size of the indicator is the same with a size of the sub-area which the indicator is displayed on.

2. A mobile terminal of claim 1, wherein the one or more display characteristics are associated with at least one of shape, size, or color of the scroll bar thumb.

3. A mobile terminal of claim 1, wherein the controller is configured to effect display of an indicator setting view on the touch screen in response to a predetermined location information indicator setting command from a user, wherein the indicator setting view permits the user to set one or more display characteristics of the indicator.

4. A mobile terminal of claim 1, wherein the controller is configured to effect display of a setting view permitting a user to select between data location indication and page location indication by the indicator.

5. A mobile terminal of claim 1, wherein the controller is configured to control the touch screen so as to perform the display the scroll bar thumb in a first, visible display state on the touch screen, and
wherein the controller is configured to cause the scroll bar thumb to switch from the first display state to a different, second, visible display state in response to a predetermined user input while displaying one or more items of the displayed data.

6. A mobile terminal of claim 5, wherein the scroll bar thumb in the second display state is of a bigger size than in the first display state or has a different color than in the first display state or a different shape than in the first display state.

7. A mobile terminal of claim 5, wherein the controller is configured to cause the scroll bar thumb to switch back to the first display state in response to a user releasing an element of the touch screen that received the predetermined user input.

8. A mobile terminal of claim 5, wherein the controller is configured to cause the scroll bar thumb to switch back to the first display state after lapse of a predetermined time period from the predetermined user input.

9. The mobile terminal of claim 5 wherein the controller is further configured to:
display a page number for each of a plurality of the sub-areas, wherein each displayed page number is displayed adjacent to a corresponding sub-area of the sub-areas.

* * * * *